(12) United States Patent
Marriott et al.

(10) Patent No.: US 7,277,951 B2
(45) Date of Patent: Oct. 2, 2007

(54) OMNIMODAL MESSAGING SYSTEM

(75) Inventors: Mark J. Marriott, Manhattan Beach, CA (US); Reza Behravanfar, Huntington Beach, CA (US)

(73) Assignee: Voice Genesis, Inc., Torrance, CA (US)

( * ) Notice: Subject to any disclaimer, the term of this patent is extended or adjusted under 35 U.S.C. 154(b) by 39 days.

(21) Appl. No.: 10/830,611

(22) Filed: Apr. 22, 2004

(65) Prior Publication Data
US 2004/0225753 A1  Nov. 11, 2004

Related U.S. Application Data

(60) Provisional application No. 60/464,436, filed on Apr. 22, 2003.

(51) Int. Cl.
*G06F 15/16* (2006.01)
(52) U.S. Cl. .................................. 709/228; 709/246
(58) Field of Classification Search ................ 709/228, 709/246
See application file for complete search history.

(56) References Cited

U.S. PATENT DOCUMENTS

| | | | |
|---|---|---|---|
| 5,790,809 A | | 8/1998 | Holmes |
| 5,832,221 A | | 11/1998 | Jones |
| 5,859,898 A | | 1/1999 | Checco |
| 5,892,916 A | * | 4/1999 | Gehlhaar et al. ........... 709/223 |
| 5,978,834 A | * | 11/1999 | Simonoff et al. ........... 709/203 |
| 6,055,240 A | | 4/2000 | Tunnicliffe |
| 6,092,114 A | | 7/2000 | Shaffer et al. |
| 6,111,893 A | * | 8/2000 | Volftsun et al. ............. 370/466 |
| 6,125,387 A | * | 9/2000 | Simonoff et al. ........... 709/218 |
| 6,172,988 B1 | * | 1/2001 | Tiernan et al. .............. 370/473 |

(Continued)

FOREIGN PATENT DOCUMENTS

EP          0 981 231 A1     2/2000

(Continued)

OTHER PUBLICATIONS

Yeo, C.K. et al., "A Unified Messaging System on the Internet," Microprocessors and Microsystems, IPC Business Press Ltd., London, BG, vol. 24, No. 10, Mar. 1, 2001, pp. 523-530.

*Primary Examiner*—Rupal Dharia
*Assistant Examiner*—Ranodhi Serrao
(74) *Attorney, Agent, or Firm*—Peter J. Manus; Edwards Angell Palmer & Dodge LLP (57) ABSTRACT

A messaging server application system handles message creation, receipt, and response for any sort of digitizable message in any format. It typically operates as a core application and application infrastructure in a communications network or networks in the multiple sender, receiver and user modes of the same or varying design and operational characteristics. The system uses an application architecture organized using a set of ten loosely-coupled subsystems falling into three general functional groups: interface/connector subsystems, core subsystems, and storage subsystems. The interface/connector subsystems include Voice, Data and Multimedia Gateways as well as Message Connectors and aMultimodal Authenticator. The core subsystems include a Multimedia Messaging Bus, an independent Metadata Messaging Bus, and a Content Transformer. The Storage Subsystem can include various Storage Subsystems. The core subsystems extract message metadata and combine this metadata with information about the delivery and routing of the message to form a "Metamessage".

7 Claims, 5 Drawing Sheets

U.S. PATENT DOCUMENTS

| | | |
|---|---|---|
| 6,216,173 B1 | 4/2001 | Jones et al. |
| 6,345,288 B1 | 2/2002 | Reed et al. |
| 6,401,132 B1 | 6/2002 | Bellwood et al. |
| 6,412,011 B1 | 6/2002 | Agraharam et al. |
| 6,430,604 B1 | 8/2002 | Ogle et al. |
| 2001/0047298 A1* | 11/2001 | Moore et al. .................. 705/14 |
| 2001/0049721 A1 | 12/2001 | Blair et al. |
| 2002/0078151 A1 | 6/2002 | Wickam et al. |
| 2002/0138582 A1* | 9/2002 | Chandra et al. ............ 709/206 |
| 2003/0040300 A1 | 2/2003 | Bodic et al. |
| 2003/0061369 A1* | 3/2003 | Aksu et al. .................. 709/231 |
| 2003/0065805 A1* | 4/2003 | Barnes, Jr. .................. 709/231 |
| 2003/0132953 A1* | 7/2003 | Johnson et al. ............. 345/716 |
| 2003/0152203 A1* | 8/2003 | Berger et al. ............ 379/93.24 |
| 2004/0002049 A1* | 1/2004 | Beavers et al. ............. 434/350 |
| 2005/0021826 A1* | 1/2005 | Kumar ....................... 709/232 |

FOREIGN PATENT DOCUMENTS

| | | |
|---|---|---|
| EP | 1185068 | 3/2002 |
| EP | 1280326 | 1/2003 |
| EP | 1 289 322 A1 | 3/2003 |
| EP | 1 298 872 A2 | 4/2003 |
| WO | WO 00/59196 | 10/2000 |
| WO | WO 01/09770 A1 | 2/2001 |
| WO | WO 01/67681 A1 | 9/2001 |
| WO | WO 01/95060 A2 | 12/2001 |
| WO | WO 02/054746 | 7/2002 |
| WO | WO 2004/080095 | 9/2004 |

* cited by examiner

OMNIMODAL MESSAGING SYSTEM

This application claims priority from U.S. provisional application Ser. No. 60/464,436 filed Apr. 22, 2003, the disclosure of which is incorporated herein by reference.

BACKGROUND OF THE INVENTION

This invention relates in general to communications systems. More specifically, it relates to a generic, multi-media, multi-channel, messaging (server application) system. The messaging system is formed of loosely coupled subsystems that can handle message creation, receipt and response for any digitalizable message, in any format, via any popular messaging device, interface, or mode, that is received and delivered via any popular channel.

Communications systems that interconnect users to transmit content are typically designed using an architecture, protocols, interfaces, end-user devices, etc., that are most effective for a given type of content, in a given format, transmitted on a known channel operating with a known protocol. A system for analog voice communications is often quite different from one for digital, data communications.

Ideally, a communication system is able to efficiently transmit messages of varying content and format using any of the common communications devices, channels, interfaces and modes. However, the variety of these options, and the competing design considerations inherent in the choices among these options, has been an obstacle to the implementation of a generic or "universal" messaging system that can receive, process and deliver messages regardless of variations in these various system and message parameters. Past approaches to messaging systems have used the commonalities among the formats of the messages they process to design the most effective architecture for handling those formats. However, where commonalities are few, and where differences are significant, known approaches have cost or performance limitations. Some examples of attempts to provide a more versatile messaging system are provided by granted and applied-for patents.

Published International Patent Application WO 01/09770, for example, describes a flexible rule-based information distribution system that selectively delivers messages generated by one or more originators to one or more recipients. The originator specifies rules to target a recipient, and a recipient also specifies rules by which to receive information. The rules refer to information that appears in user profiles and message data. There is no transformation of content, no synchronization of multimodal, multi-channel communications, and no generic user interfaces to publish to multiple node interfaces.

U.S. Pat. No. 6,345,288 discloses a communication system that transfers data, metadata and methods from a provider computer to a consumer computer via a network. Metadata is used to provide combined control between the consumer and provider computers of the types and content of information transferred. There is no separation of the metadata and message content, nor multimodal synchronization of synchronous and asynchronous end user messages over multiple channels, as required in a truly universal communications system.

U.S. Pat. No. 6,401,132 describes a Content Transformer operating on an input stream. There is no teaching of using such a transformer to provide a generic, multi-mode, multi-channel, synchronous and asynchronous communications over a network.

U.S. Pat. No. 5,859,898 describes a Nynex system that can transmit both voice and data messages. However, it does not operate to accept multi-channel communication to the same device, there is no multimodal synchronization, no integration to external messaging systems, the system is not massively distributed, and its operation does not separate and process independently the metadata and content of a message.

Published US Patent Application No. US2002/0078151 discloses a system for communicating messages of various formats between diverse communications devices. It can transmit over PSTN or IP networks. However, it uses a layered design that builds on these networks, not an application architecture operable within a network or networks. It also operates on messages and their metadata in the traditional manner, as an integral message unit.

In sum, while many solutions have been proposed or used for enhancing the capabilities of message communications systems, they solve some problems and add some capabilities, but there is no system that is truly universal and generic.

It is therefore a principal object of this invention to provide an Omnimodal messaging system that can transmit multi-media messages received and delivered over multi-channels.

Another principal object is to provide a Omnimodal messaging system with the foregoing advantages that also operates in conjunction with any common communications device, interface, or mode.

Still another object is to provide these advantages for communications devices and protocols that are synchronous and asynchronous.

A further object is to provide the foregoing advantages in a system that is also scalable.

Yet another object is to provide the foregoing advantages while providing platform independent connections to external systems.

Another object is to provide a communications system that can receive, process and deliver message content in any media as long as there is a logical mapping between the content types and a transformation module exists.

SUMMARY OF THE INVENTION

The present invention viewed as a multimedia messaging system connects sender and recipient end-users. The system operates in a network or networks each having multiple sending and recipient nodes that can interface with other external messaging systems, messaging devices, or human operators. The messaging system includes three functional groups: interface/connector systems, core subsystems, and Storage Subsystems. They, in turn, are formed from ten subsystems.

The interface/connector subsystems receive, process and deliver messages that include metadata and whose message content that can differ from message to message and type and be delivered to and from devices and computer platforms that can differ in type, over delivery channels, protocol and interface.

The core subsystems including a Content Transformer, a Multimedia Messaging Bus, and a Metadata Messaging Bus, said buses interacting with all the interface/connector functional subsystems and the Content Transformer. The interface/connector, storage and core subsystems operate to:

i. asynchronously, and with adequate processing resources, synchronously, produce, process and deliver a Metamessage on the meta data messaging bus independent of the processing and delivery of the original message, with the Metamessage containing instructions for processing the original message and the Metamessage used by the rest of the system to determine how it will process the original message;

ii. reformat and translate all message content, if necessary, to a form compatible with the recipient; and iii. synchronize the receipt, processing and delivery of the messages to deliver such multimedia messages and to synchronize messages with other external messaging systems.

Using this system the end-users are enabled to manage their messages in an Omnimodal and in an asynchronous and synchronous manner including messages of different content types and formats in support of different interfaces, messaging devices, and modes of creation, receipt and response, via plural channels, using plural protocols, in support of plural messaging platforms. The core subsystems are loosely coupled—they interact, but they operate independently so that changes in one component does not necessarily require changes in other interconnected components.

Viewed as a process, the present invention is a method for interconnecting plural communication devices communicating multimedia messages in a network or networks via sending and recipient nodes with messaging devices and systems or human operators external to the network or networks. It includes as steps:

interfacing with said networks, devices, systems and operators, and then separating the message being communicated into multimedia message output (or content) and related metada. A central aspect of this invention is the step of creating, processing and delivering a Metamessage on a bus independently of the multimedia message being delivered and processed.

This processing includes reformatting and translating and storing message content as needed to be compatible with a recipient node. Another step involves synchronizing the receipt, processing, and delivery of the multimedia message content with external messaging systems.

The invention will be more fully understood from the following detailed description which should be read in light of the accompanying drawings.

DETAILED DESCRIPTION OF THE INVENTION

Figure 1:
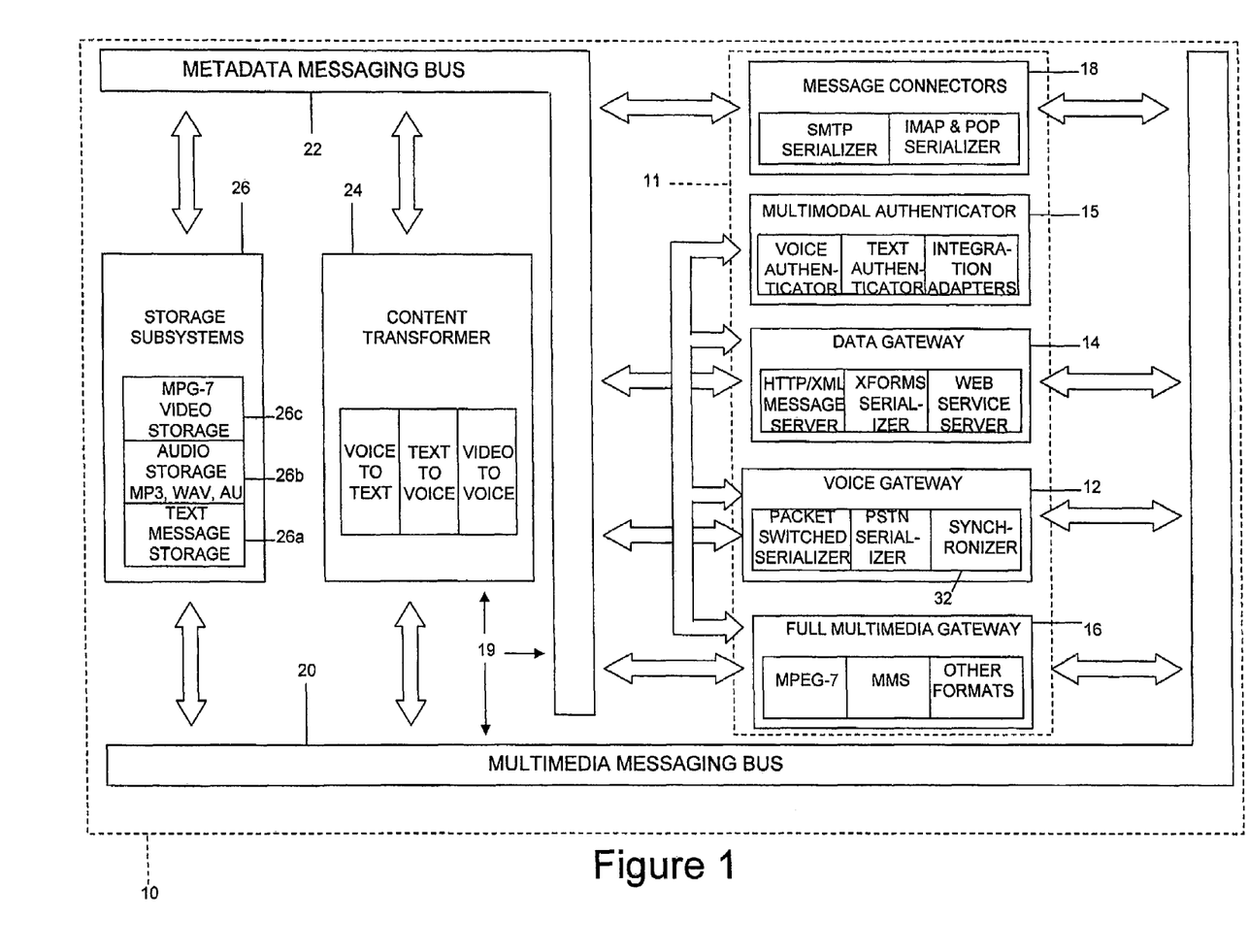
FIG. 1 is a block diagram showing the overall messaging server application architecture of the present invention.

The messaging server application system 10 according to the present invention, shown in overview in FIG. 1, is designed to handle message creation, receipt, and response for any sort of digitizable message in any format, including, but not limited to, voicemail, email, short text (Short Message Service (SMS)), Multimedia Messaging Service (MMS), instant messages, and faxes, via any popular end user messaging device (phone, mobile phone, handheld computer, desktop/laptop computer, fax machine, converged devices), via any popular interface (Wireless Application Protocol (WAP) browser, voice interface, WAP/voice, SMS client, MMS client, Java client, Brew (Binary Run-time Environment for Wireless) client, web browser, thick IM client, etc.), in any mode (text, audio, still image, moving images, or combination thereof), and received or delivered via any popular channel (Public Switch Telephone Network (PSTN), Internet, etc.). It is thus multimodal. The messages handled by the system 10 can vary in content among the messages, or within the same message. The messaging server system 10 with these characteristics is termed, herein, "Omnimodal". It typically operates as a "core application and application infrastructure" in a communications network or networks in the multiple sender, receiver and user modes of the same or varying design and operational characteristics. The messaging system 10 is assembled through machine-to-machine and/or human-to-machine interfaces.

This generic or universal messaging system 10, termed herein as "Omnimodal", uses a multi-media messaging server application architecture organized using a set of ten loosely-coupled subsystems: These subsystems, as detailed below, fall into three general functional groups 11, 19, and 26.

Interface/Connector Subsystems 11
1. Voice User Interface Gateway 12
2. Data Gateway 14
3. Multimedia Gateway 16
4. Message Connectors 18
5. Multimodal Authenticator 15

Core Subsystems 19
6. Multimedia Messaging Bus 20
7. Metadata Messaging Bus 22
8. Content Transformer 24

Storage Subsystems 26
9. Storage Subsystems (various) 26

The first five of these subsystems 12-18 are interface/connector subsystems. They all interact with the world external to the application. They support all the interfaces. They also manage connections to external telecommunications and data networks as well as to external messaging systems. They are responsible for sending and receiving any popular kind of message in any popular mode for any popular device, as detailed above.

The next three subsystems 20, 22, 24 can be thought of as the brains or core of the system. They extract message metadata (data about messages), including message type, format, mode of creation, address, originating device, subscriber, etc. They combine this metadata with information about the delivery and routing of the message provided by the networking infrastructure, information encapsulated in the user preferences and the user registry, as well as with instructions on how to process the message and the Metamessage itself. All these elements are contained within an element termed the "Metamessage" (Metamessage is "reflective"). The Metamessage is processed to determine what the system must do to deliver the original messaging; what content transformations (if any) need to be performed on the original message; what formats and interfaces will be used to deliver the original message. Original or transformed parts of the original message and/or a forerunner message may then be sent to external facing subsystems that then handle delivery.

The last set of subsystems, the Storage Subsystems 26, store all of the information used by the system, namely the messages themselves, Metamessages, subscriber preferences, and registry data.

The system 10 handles any format, and avoids any architectural commitments that rely on format commonalties. The resulting system can be termed "format independent." The core subsystems reduce any message to two sets of data—the message, and data about the message. The only assumption relied upon by the system is that all messages can be reduced to binary data. The Content Transformer 24 includes algorithms for converting message formats.

The loosely-coupled nature of the subsystems enables modifications to one subsystem to occur without necessitating modifications to the others. As times goes on and new message formats are introduced into the market, this system will readily accommodate these new formats. An additional layer need not be added. To handle the new format, the system 10 simply adds a connector or interface to the interface/connector subsystems 12-18, adds format conversion capability to the Content Transformer 24, and adds any relevant compression technology to the Storage Subsystem 26. The architecture itself need not change. "Loosely coupled" as used herein means that while the subsystems are operatively interconnected, they operate generally independently. For example, the Content Transformer operates asynchronously on message content as presented via the buses 20 and 22. Also, a Metamessage is created and delivered on the bus 22 independently of the associated multi-media message content carried on the bus 20. In the preferred form, the buses 20 and 22 are software buses, not hard wire buses, or the like.

Subsystem Descriptions

Voice Gateway 12

Figure 2:
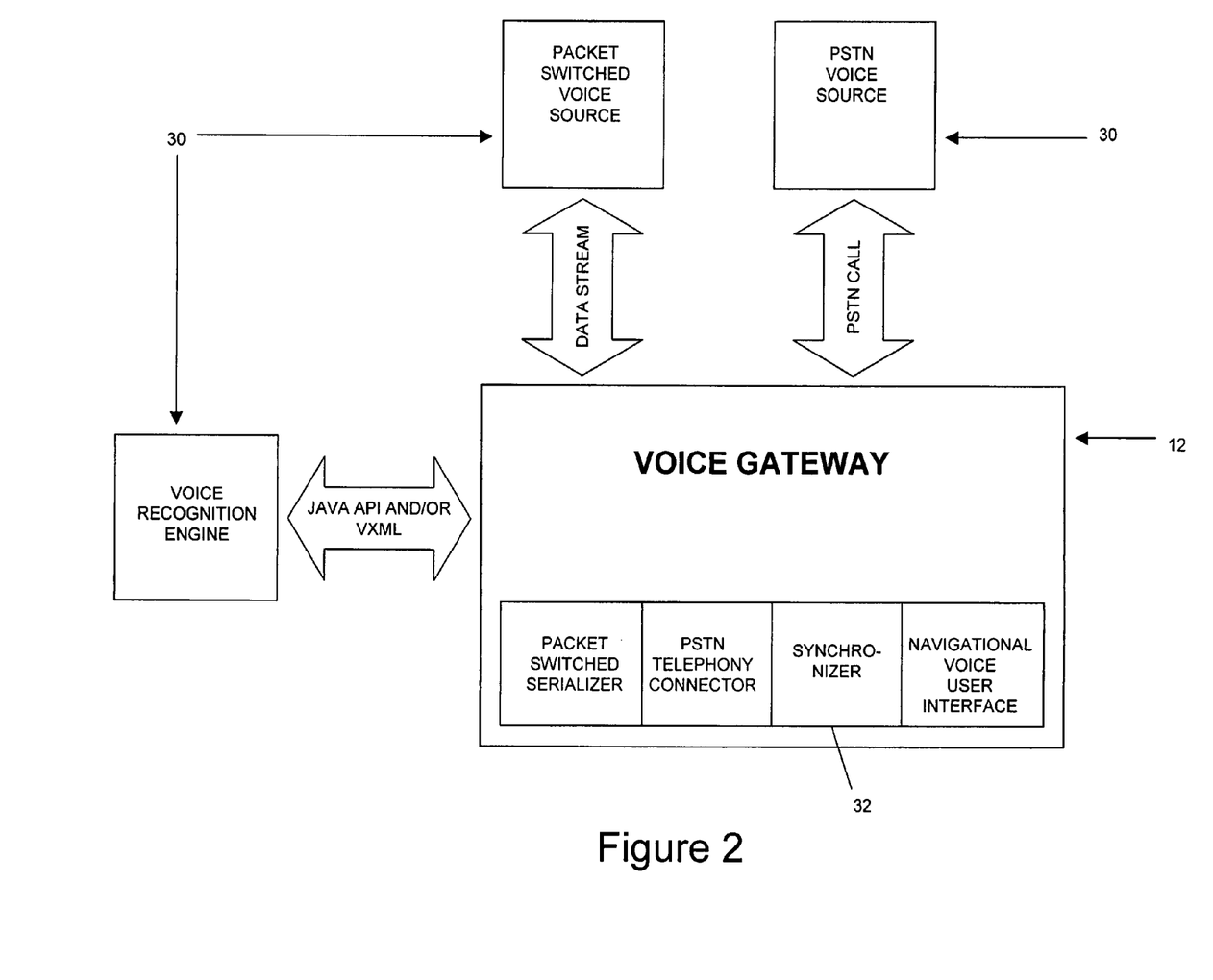
FIG. 2. is a more detailed block diagram of the Voice User interface Gateway shown in FIG. 1.

As shown in FIG. 2, this subsystem 12 enables reception of any type of voice message through voice-specific channels 30 such as PSTN, IP telephony, packet-switched telephony, and other cellular telephony of which three representative channels are illustrated. The Voice Gateway 12 is an entry point that accommodates all of the different methods of connecting to the voice user interface, and makes all voice related interactions with the system appear the same to the rest of the system. The Voice Gateway 12 enables the other components of the system to treat voice without the concern for how the voice was obtained, or what format it is in. The Voice Gateway 12 itself is rendered with standards-compliant VoiceXML, thereby adhering to the Extensible Markup Language (XML) mandate of the architecture. The Voice Gateway 12 includes functionality that enables it to synchronize multi-part messages that have one or more types of content. Since the Voice Gateway 12 is only designed to handle the voice portion of the content, through any voice channel, it will use a synchronization mechanism 32 (SMIL—Synchronized Multimedia Integration Language—compliant) to work with the Data Gateway 14, the Multimedia Messaging Bus 20, and other components in the system 10.

Data Gateway 14

Figure 3:
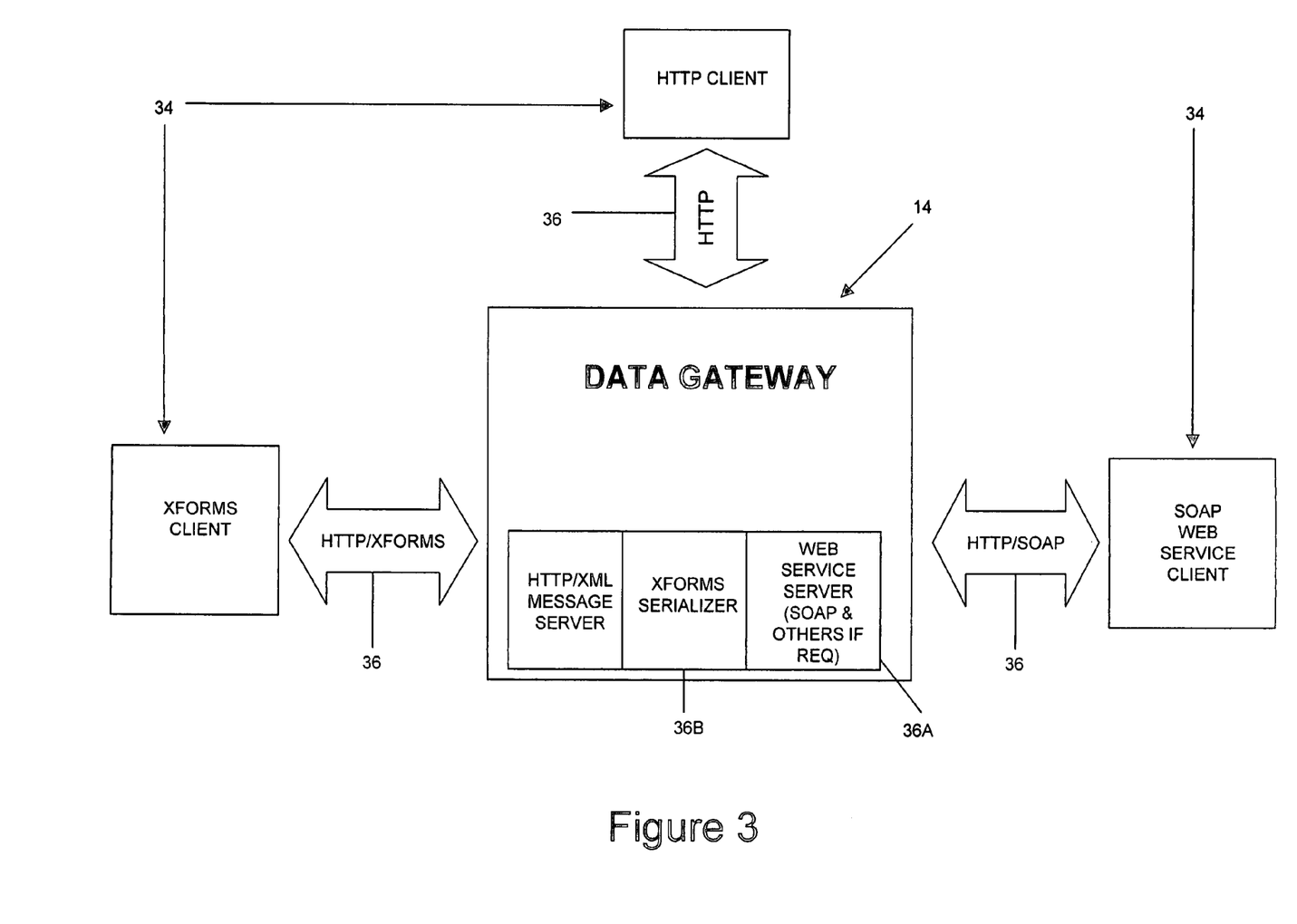
FIG. 3 is a more detailed block diagram of the Data Gateway shown in FIG. 1.

Much of the interaction between outside systems 34 (shown in FIG. 3 as three representative such systems 34) and the system 10 is done through the Data Gateway 14. The Data Gateway 14 also handles connections for subscribers. The specific subscriber interfaces are rendered, by proxy, through the Content Transformer 24 and then sent out through the Data Gateway 14. The Data Gateway enables reception of any type of data message through data specific channels 36 such as HTTP/XML, W-HTTP, i-mode, and BREW. The Data Gateway 14 offers access to the system 10 through various web service types including Simple Object Access Protocol (SOAP) 36a and Xforms 36b. SOAP 36a allows external applications to communicate with the Data Gateway independent of the computer platform. SOAP 36a can be thought of as an XML schema for remote procedure calls, like message retrieval. XForms enables rendering of generic interfaces. XForms interfaces can be transformed to specific user interface types at the node. In this way carriers can render proprietary subscriber interfaces that have pre-built interaction sets with the application. As a result, mobile carriers will be able to create their own subscriber interfaces in a more flexible and less costly way by simply creating one set of Extensible Stylesheet Language Transformations (XS-LTs). Whereas a simple XML interface requires the customer to create workflow code, XForms streamlines this process by eliminating that requirement. XForms 36b is a World Wide Web Consortium (W3C) standard. By providing these two distinct types of web service interfaces (SOAP and XForms), the application optimizes connectivity options for users of the system 10. The end result is an application that is more flexible and less costly to deploy than anything now available.

Full Multimedia Gateway 16

The subsystem 16 serves the same general function as the Data Gateway 14, but is designed to receive/send any type of multimedia file or message format such as MMS, Moving Picture Experts Group (MPEG), MPEG-4, MPEG-7, FLIC, Audio Visual Interleaved (AVI), QuickTime Movie (MOV), Artificially Structured Films (ASF), Macromedia Flash, etc.

Message Connectors 18

Figure 4:
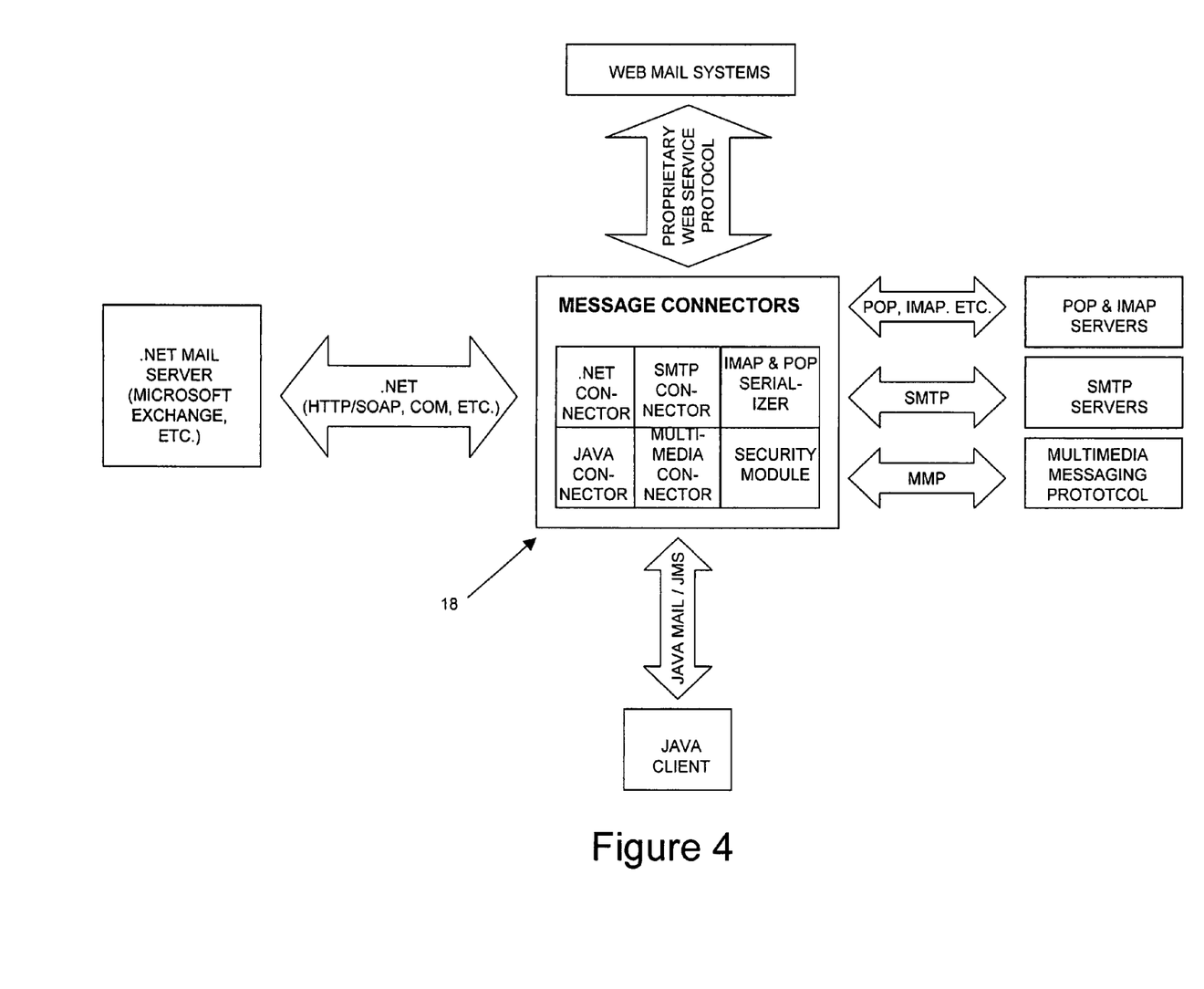
FIG. 4 is more detailed block diagram of the messaging connector shown in FIG. 1; and, FIG. 5 is a more detailed block diagram of the Content Transformer shown in FIG. 1.

The subsystem 18 shown in FIG. 4 is designed to connect with external messaging systems such as Simple Mail Transfer Protocol (SMTP), Post Office Protocol (POP), Internet Messaging Access Protocol (IMAP), Short Message Service Center (SMSC), and Multimedia Messaging Service Center (MMSC). This subsystem is able to exchange messages with other messaging systems outside of the system 10, as well as with the Multimedia Messaging Bus 20 and Metadata Messaging Bus 22.

Multimodal Authenticator 15

The major task of the Multimodal Authenticator is to provide a secure mechanism for end users, be it user devices or foreign networks, to communicate with the Voice Genesis system. The Multimodal Authenticator provides authentication, authorization, and secure communication between all external interfaces to the Voice Genesis server systems and all foreign systems. This subsystem provides the following functionality: (1) Authenticating the user through a variety of modalities (voice-print, text-based password, etc.) In this way, we provide a user-friendly mechanism for authentication and authorization regardless of modality. (2) Integration with foreign systems that provide various levels of authorization or group-wise authentication. (3) A mechanism by which the distribution of users' messages amongst many different locations is made possible. The Multimodal Authenticator is used to facilitate an intelligent distribution of the data based on the last known connection status of the end user device. (4) Integration with carrier authentication systems. This is done so that carriers can provide services using the system 10 along side other services and the authentication is seamless to the end user. For example, if a user already has a user-name and password in the carrier network, the Multimodal Authenticator enables the Voice Genesis servers to accept the same set of credentials for authentication and authorization.

In implementation, the Multimodal Authenticator is built by integrating existing standard authentication, authorization, and encryption mechanisms such as private-public key exchanges used in TLS/SSL. In cases where not relevant, such as voice printing (recognizing the user by using a pre-recorded voice segment that confirms liveliness and authentication), suitable known technique to modality is used to authenticate and authorize the user in a secure manner. While the Multimodal Authenticator is an amalgamation of existing authentication techniques and tools, it connects these tools and techniques together to offer a seamless and user-friendly authentication and authorization experience to the end users as well as facilitate ease of integration with foreign systems, each of which may have their own authentication and authorization systems.

Multimedia Messaging Bus 20

The Multimedia Messaging Bus 20 allows different types of media to be put in a queue and then processed. It solves several different requirements. First, it allows coordinated access to all of the contents of the message (regardless of what type of content is inside the message) by different processing subsystems (Content Transformer 24, Storage Subsystem 26, etc.). Second, it provides this access in a scalable and asynchronous manner. As a result spikes in message traffic do not cause the system 10 to halt. Finally, it permits the content of the message to be retrieved at run-time while the information about the message (on the Metadata Messaging Bus 22) is replicated to all of the different nodes on a distributed network.

Metadata Messaging Bus 22

The Metadata Messaging Bus 22 transports Metamessages (as defined above) between subsystems, so subsystems can coordinate to process messages. In order to provide a decoupling between messages and information about the messages in the presently preferred form of the invention, the Interface/Connector Subsystems 11 create Metamessages that contain data about the original messages. These Metamessages are then placed on the Metadata Messaging Bus 22. The Metamessages are themselves provided as messages on a queue. This enables the clients of the Multimedia Message Bus 22 to know needed information about the messages prior to actually processing the messages. This approach provides tunable performance and scalability.

Content Transformer 24

Figure 5:
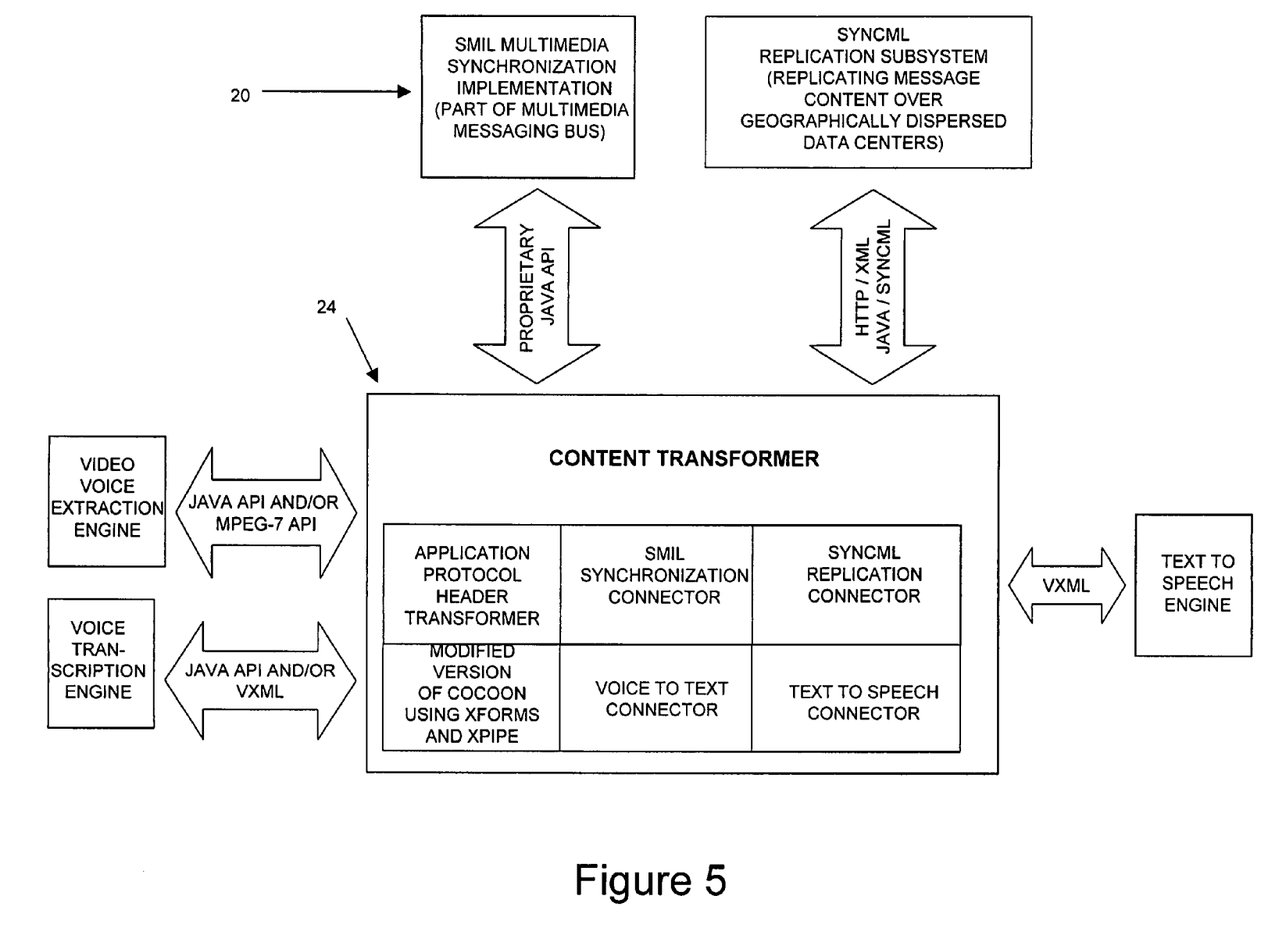

The subsystem 24 shown in detail in FIG. 5 transforms any popular message format into any other popular message format to facilitate message creation and delivery via any popular format, interface, device, mode, or channel. In one form of the invention that is more easily implemented, content transformation is done asynchronously, that is, on a deferred basis. This approach lessens the performance and scalability requirements inherent to synchronous systems. Transformation appears to be synchronous to the extent that processing resources are available. In other words, while the invention in its present preferred form operates asynchronously, that asynchronous operation can appear to be synchronous, e.g., if there is no queuing on the buses 20 and 22.

Transformable content includes any combination of text, still images, audio, and moving images. Because messages may include any combination of these content modes, the total number of combinations is twenty-four on both the sending and receiving side. These modes each contain multiple formats that must be supported.

Storage Subsystems 26

The set of Subsystems 26 handles storage of the various content pieces of stored messages. The messages and parts of messages, whether text, still images, audio, and/or moving images, must be stored. These subsystems are comprised of several off the shelf components amongst which the most important are:

Text Message Storage:

The database 26a is used to store the message metadata to facilitate searches, queries, and data mining. The database 26a may also be used to store the text portion of messages.

File Storage: The multimedia or voice files are stored in their native format in a file Storage Subsystems 26c and 26b, respectively, and then be processed by the Content Transformer 24 to be played back to the user. The Content Transformer 24 can also write back to the Storage Subsystems 26 to use them as a caching mechanism, or to provide different types of file formats. There are a variety of file formats each of which may require a particular type of storage as the system scales. Several standard compression methods are used to facilitate storage of various formats. The Storage Subsystems 26a-c as shown are also designed to support streaming delivery of messages to recipients.

LDAP: A Lightweight Directory Access Protocol (LDAP) implementation is used with Storage Subsystem 26 to find the location of the stored files. LDAP is a set of protocols based on standards within the X.500 standard, but simplified, and allows any type of Internet access. It runs almost any application and is compatible with all popular computer platforms. Java Naming and Directory Interface (JNDI) interfaces are provided to facilitate fail-over capabilities.

The Subsystems 26 can be considered as a single storage subsystem with sub-systems associated with various message types, and one or more sub-subsystem for message management and retrieval.

File Storage: The multimedia or voice files are stored in their native format in a file Storage Subsystems 26c and 26b, respectively, and then be processed by the Content Transformer 24 to be played back to the user. The Content Transformer 24 can also write back to the Storage Subsystems 26 to use them as a caching mechanism, or to provide different types of file formats. There are a variety of file formats each of which may require a particular type of storage as the system scales. Several standard compression methods are used to facilitate storage of various formats. The Storage Subsystems 26a-c as shown are also designed to support streaming delivery of messages to recipients.

LDAP: A Lightweight Directory Access Protocol (LDAP) implementation is used with Storage Subsystem 26 to find the location of the stored files. LDAP is a set of protocols based on standards within the X.500 standard, but simplified, and allows any type of Internet access. It runs almost any application and is compatible with all popular computer platforms. Java Naming and Directory Interface (JNDI) interfaces are provided to facilitate fail-over capabilities.

The Subsystems 26 can be considered as a single storage subsystem with sub-systems associated with various message types, and one or more sub-subsystem for message management and retrieval.

While this invention has been described with respect to its preferred embodiments, it will be understood that various modifications and alterations will occur to those skilled in the art from the foregoing detailed description and the accompanying drawings. For example, other numbers of subsystems can be used intercommunicating through other bus architectures besides two parallel buses that open multimedia messages and Metamessages. As shown, for example, the buses include a communication path between the authenticator 15 and the Voice, Data, and Multimedia Gateways 12, 14, and 16. The system 10 is readily scalable, up or down. In each variation, however, data about a message is separated from the message itself, a new message is then created to hold this data; the original message and new message are processed as independent messages; the new message is used by the system to determine how to process the original message. While it is possible to utilize non-bus network topologies, e.g. a star or ring topology, the bus implementation described and illustrated is presently preferred as the most readily implemented topology that touches all of the subsystems. As used herein, the term "bus" is intended to include these alternative topologies. Still further, the two buses 20 and 22 can be implemented as a single bus using known transmission management techniques such as interleaving.

What is claimed is:

1. A multimedia messaging system for sender and recipient end-users where the system operates in a network or networks each having multiple sending and recipient nodes that can interface with other external messaging systems, messaging devices, or human operators, the messaging system comprising:
   a. interface/connector subsystems that receive, process and deliver messages that include metadata and whose message content that can differ from message to message and type and be delivered to and from devices and computer platforms that can differ in type, over delivery channels, protocol and interface,
   b. a Storage Subsystem
   c. core subsystems including a Content Transformer, a Multimedia Messaging Bus, and a Metadata Messaging Bus, said buses interacting with all said interface/connector functional subsystems and said Content Transformer,
   d. said interface/connector, storage and core subsystems operating to:
      i. asynchronously, and with adequate processing resources, synchronously, produce, process and deliver a Metamessage on said Metadata Messaging Bus independent of the processing and delivery of the original message,
      said Metamessage containing instructions for processing the original message and the Metamessage used by the rest of the system to determine how it will process the original message;
      ii. reformat and translate all message content, if necessary, to a form compatible with the recipient; and
      iii. synchronize the receipt, processing and delivery of the messages to deliver such multimedia messages and to synchronize messages with other external messaging systems,
   whereby the end-users are enabled to manage their messages in an Omnimodal and in an asynchronous and synchronous manner including messages of different content types and formats in support of different interfaces, messaging devices, and modes of creation, receipt and response, via plural channels, using plural protocols, in support of plural messaging platforms.

2. The multimedia messaging system of claim 1 wherein said interface/connector, storage and core subsystems, including said Multimedia and Metadata Messaging Buses, interacting is loosely coupled.

3. The multimedia messaging system of either one of claim 1 or claim 2, wherein the storage subsystem comprises separate systems each for storing messages of a specific type and at least one system for message management and retrieval from the separate systems of the storage subsystem.

4. The multimedia messaging system of claim 1, further comprising a message connector for connecting with external messaging systems, said external messaging systems including Simple Mail Transfer Protocol (SMTP), Post Office Protocol (POP), Short Message Service Center (SMSC) and Internet Messaging Service Center (MMSC).

5. The multimedia messaging system of any one of claims 1, 2 or 4, wherein the messages include voice messages, including voice messages received through voice specific channels where said voice specific channels include Public Switched Telephone Network (PSTN), Internet Protocol (IP) telephony, packet-switched telephony and other cellular telephony.

6. The multimedia messaging system of any one of claims 1, 2 or 4, wherein the messages include data messages, where said data messages include data messages received through data specific channels and said data specific channels include Hyper Text Transfer Protocol (HTTP), Extensible Markup Language (XML), WAP Wireless Profiled HTTP (W-HTTP), internet mode (i-mode) and Binary Runtime Environment for Wireless (BREW).

7. The multimedia messaging system of any one of claims 1, 2 or 4, wherein the messages include multimedia messages and/or multimedia files, including multimedia messaging service (MMS), Moving Picture Experts Group (MPEG), MPEG-4, MPEG-7, FLIC, Audio Visual Interleaved (AVI), QuickTime Movie (MOV), Artificially Structured Films (AFS) and Macromedia Flash.

* * * * *